United States Patent [19]
Denk et al.

[11] Patent Number: 5,878,806
[45] Date of Patent: Mar. 9, 1999

[54] HEATING AND/OR AIR-CONDITIONING INSTALLATION

[75] Inventors: Walter Denk; Wolfgang Kniele, both of Ditzingen; Ralf Martin, Benningen; Vladimir Neumann, Remchingen; Werner Rauland, Pforzheim; Leopold Seczer, Erdmannshausen, all of Germany

[73] Assignee: Behr GmbH & Co., Stuttgart, Germany

[21] Appl. No.: 682,664

[22] PCT Filed: Nov. 14, 1995

[86] PCT No.: PCT/EP95/04462

§ 371 Date: Jul. 29, 1996

§ 102(e) Date: Jul. 29, 1996

[87] PCT Pub. No.: WO96/16827

PCT Pub. Date: Jun. 6, 1996

[30] Foreign Application Priority Data

Nov. 28, 1994 [DE] Germany .................... 44 42 000.5

[51] Int. Cl.[6] ................................................ F25B 29/00
[52] U.S. Cl. .............................. 165/42; 165/43; 165/103; 237/12.3 A; 454/318; 454/319; 454/334
[58] Field of Search ................................ 165/42, 43, 103; 237/12.3 A; 454/318, 319, 334

[56] References Cited

U.S. PATENT DOCUMENTS

| 3,366,141 | 1/1968 | Foster | 454/334 |
|---|---|---|---|
| 3,894,481 | 7/1975 | Alley | 454/318 |
| 4,518,012 | 5/1985 | O'Hara | 454/319 |
| 4,534,507 | 8/1985 | Matsuda | 165/46 |
| 4,852,639 | 8/1989 | Horiguchi et al. | 237/12.3 A |
| 5,162,020 | 11/1992 | Asano et al. | 165/103 |

FOREIGN PATENT DOCUMENTS 1643202  4/1991  U.S.S.R. .

*Primary Examiner*—John K. Ford
*Attorney, Agent, or Firm*—Evenson, McKeown, Edwards & Lenahan, P.L.L.C.

[57] ABSTRACT

1. Heating and/or air-conditioning installation, especially for a passenger compartment of a motor vehicle.

2.1 In known installations for heating and/or cooling, hinged flaps are employed as control means for distributing the air, which flaps need a large mounting space.

2.2 It is proposed that a mounting frame with hinged or sliding lamellae be inserted into the free cross-sections of each of the channels to be controlled.

2.3 Use of the motor vehicle air-conditioning systems.

18 Claims, 5 Drawing Sheets

HEATING AND/OR AIR-CONDITIONING INSTALLATION

The present invention relates to a heating and/or air-conditioning installation, especially for a passenger compartment of a motor vehicle, having a housing containing at least one heater and one vaporizer, inlet and outlet openings and air channels connecting the latter for causing air to flow selectively through the vaporizer, the heater or both of them, and control means associated with the channels for closing or opening them and for determining the free cross-section for the air volume passing therethrough.

Heating and/or air-conditioning installations of this type are already known. The basic structure of such installations is illustrated in FIG. 2. These known installations employ hinged flaps as control means, which flaps are arranged in such a way that they function as double-armed lever whose two parts, that project from the pivot axis, act to open or close, respectively, correspondingly arranged channels. The system is designed in such a way that, for example for cooling purposes, the air arriving from the vaporizer is directed immediately into the passenger compartment of the car, when the control flap occupies the corresponding position, or—for heating and/or drying purposes—the air is directed in its entirety first through the heater and then into the passenger compartment of the car, it being understood that intermediate positions of the flaps are also possible, depending on their opening angle. Heating and/or air-conditioning installations of this kind require by design a certain built-in depth, designated by $L_2$ in FIG. 2.

DE-41 19 474 A1 discloses a heating or air-conditioning system for a passenger compartment of a motor vehicle, where in order to enhance the intermixing of hot and cold air louver-like flaps are provided as control elements for the intake of fresh air and hot air. As stated in this publication, the described design is capable of making available, in a comparatively small mixing chamber, air of homogeneous temperature for transmission into the passenger compartment. However, the illustrated arrangement does not contribute towards reducing the overall installed dimensions of the heating or air-conditioning system. In addition, the arrangement of a plurality of hinged flaps, which are intended to work together as louvers but which must be installed separately, is a relatively complex process.

The same applies to other known heating and air-conditioning installations for a passenger compartment of a motor vehicle (DE 32 03 927 A1), where a heat exchanger is preceded in the area of the motor compartment by a flap register which is coupled with a closure member for a return line that can be moved in opposite sense. In the case of this installation, almost all other control elements still required for the control of the air flow are designed as hinged flaps as before.

Now, it is the object of the present invention to provide a solution for heating and/or air-condition installations of the before-described type, which solution allows a considerably reduction of the overall installed dimensions, without however considerably increasing the constructional input or having to accept any disadvantages regarding the functioning of the installation.

This object is achieved with a heating and/or air-conditioning installation of the before-described type by means of an arrangement where the control means are designed as mounting frames adapted to the cross-section of the channels, with a plurality of lamellae guided in the frame, whose dimensions are conveniently selected to procure that in the closed position they cover the entire cross-section of the frame. As a result of this arrangement, the space required for the pivotal movement of the flap is no longer needed so that considerably smaller installed lengths can be achieved, equal to only 60% of the length of a designed comprising a hinged flap, as is indicated by $L_1$ in FIG. 1, which will be described in more detail further below. Moreover, the air outlet openings from the mixing chamber may also be equipped with such mounting frames with lamellae, with the resulting advantage that smaller overall dimensions are achieved. The installation of the frame receiving the lamellae is easy, especially if the required insertion openings or receiving pockets for the frames are preformed in the housing.

According to a further development of the invention, each lamella may be arranged to swing around an angle of 90° about an axis supported in the frame.

However, there is also the possibility to arrange the lamellae to slide in the frame in parallel, in the manner of shutters. In both these cases, the lamellae can be connected one with the other and can be driven in common. And of course combinations of hinged and sliding lamellae are also possible.

According to a further development of the invention, the lamellae may take the form of grids with flow profiles that are aligned in the direction of flow, in which case two such grids are arranged to slide one relative to the other for influencing the free cross-section, one of such grids being stationary, whereas the other one is arranged to slide. The grids may be provided in this case with lamellae forming a drop-shaped flow profile in the initial flow direction, the space between neighboring lamellae corresponding approximately to the greatest width of the lamellae of the second grid. If in the case of this design the two grids are made to move one relative to the other in the flow direction, then the profiles of the lamellae of one grid are slid to a lesser or greater extent into the free cross-section of the profiles of the other grid, with the result that the free cross-section is rendered adjustable and the lamella arrangement so formed may even be fully closed.

Another variant of the invention provides the possibility to make part of the flow profiles displaceable in transverse direction to the initial flow direction so that, for example, the front portions of the flow profiles, in the direction of flow, are caused to enter the space between neighboring profiles so that it is rendered possible in this way, too, to control the free cross-section of the grid, or to close it completely. In all cases, a common drive may be provided for adjusting the lamellae.

The invention will now be described by way of certain exemplary embodiments that are illustrated in the drawings, in which.

Figure 1:
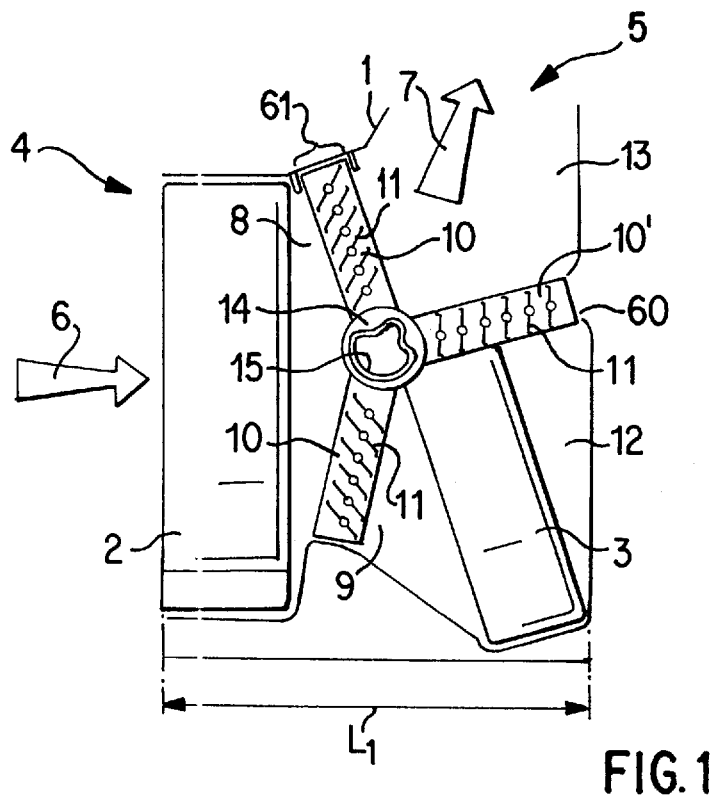
FIG. 1 shows a diagrammatic longitudinal cross-section through a first embodiment of a heating and/or air-conditioning installation for a motor vehicle according to the invention.

The diagrammatic representation of FIG. 1 shows a housing (1) of a heating and/or air-conditioning installation for a motor vehicle, including a vaporizer (2) and a heater (3). The housing (1) comprises an inlet (4) and an outlet (5) for an air flow that is introduced into the housing (1) in the direction of arrow (6), aided for example by a blower, and that leaves the housing (1) in the direction of arrow (7) in order to be discharged into the passenger compartment of a motor vehicle in a manner not shown in detail. Between the inlet (4) and the outlet (5) there are provided in this example two flow paths in the form of channels (8 and 9), the arrangement being such that one of the channels (8) can be opened and closed by a mounting frame (10) with hinged lamellae (11), while the channel (9) can be opened and closed by a mounting frame (10) of substantially identical design and likewise provided with lamellae (11), as will be described in more detail further below with reference to FIGS. 3 to 6. The channel (9) leads into a chamber (12) in which the heater (3) is arranged. The chamber (12) in its turn can be closed and opened, at its junction with the outlet chamber (13) extending next to the channel (8) behind the mounting frame (10), by another mounting frame (10') of principally the same design as the mounting frame (10) in the channel (8 and 9). The swing angle of the lamellae permits the air flow to be directed, whereby improved intermixing of two air flows can be achieved.

In the illustrated embodiment, the three mounting frame (10 and 10') provided with the lamellae (11) are disposed in substantially star-like arrangement and can be introduced, in a direction perpendicular to the drawing plane, into mounting openings of the housing (1), or can be fitted in corresponding receiving pockets (61) during assembly of the housing. As is indicated schematically, they are driven by a common drive (14), which is equipped with a rotatable cam disk (15). The design of the cam disk (15) is such that depending on the swing angle the opening and closing actions of the two mounting frames (10) are matched in such a way that one of the frame will be closed when the other one is open. The lamellae of the mounting frame (10') are in their fully open position when the lamellae (11) of the mounting frame in channel (9) are in their fully open position. They are closed when the lamellae (11) of the mounting frame in the channel (9) are also closed and the lamellae (11) of the mounting frame (10) in channel (8) are in their fully open position.

This then results in the following, selectively adjustable working positions:

The flow channel (8) is open. The flow channel (9) and the chamber (12) are closed. Fresh air entering the system in the direction of arrow (6) is guided through the vaporizer (2) and is permitted to enter the passenger compartment for cooling, in the direction indicated by arrow (7).

The channel (8) is closed, whereas the channel (9) and the chamber (12) are open. Fresh air then flows through the vaporizer (2) and the heater (3), is dried and heated up and then permitted to enter the passenger compartment. If the lamellae (11) are partially open, as indicated in FIG. 1, then part of the fresh air will enter the passenger compartment directly, while another part will be directed additionally across the heater (3).

Figure 2:
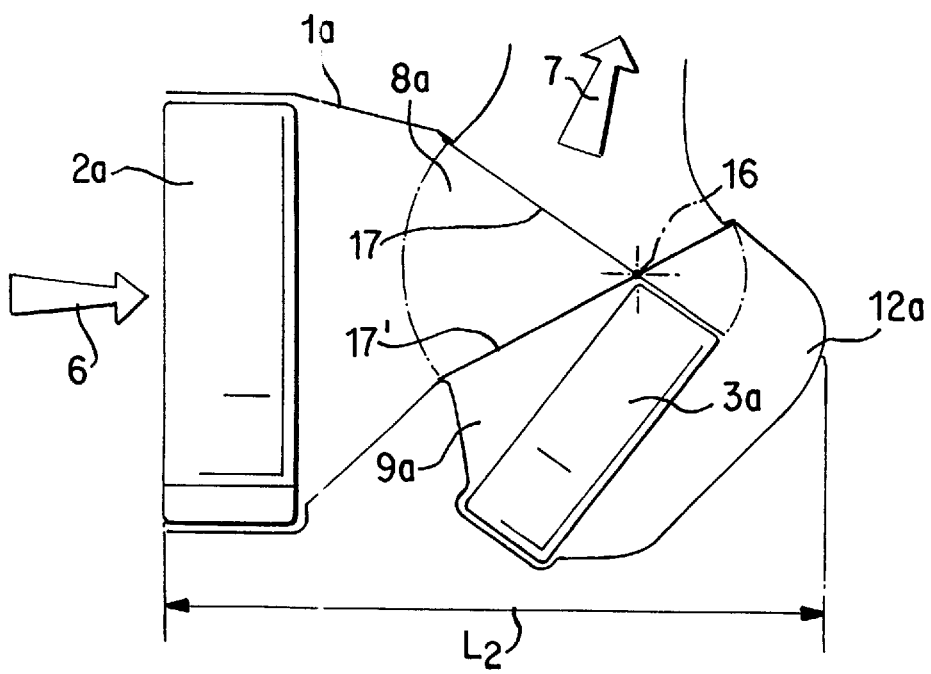
FIG. 2 shows a cross-section similar to that shown in FIG. 4, but through a prior-art installation.
Figure 3:
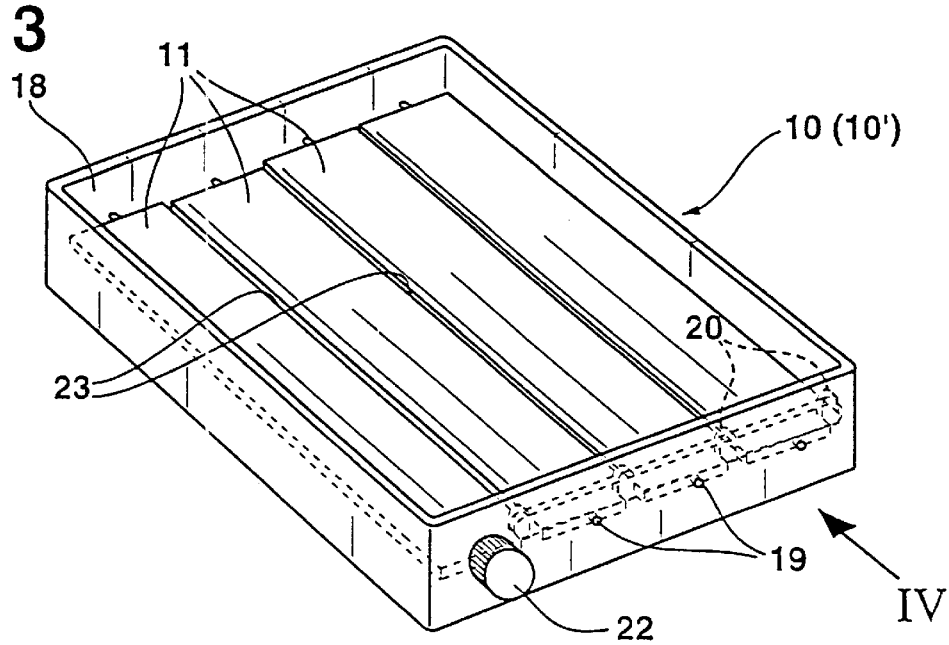
FIG. 3 shows a perspective representation of a mounting frame employed in the embodiment shown in FIG. 1, with the lamellae in their closed position.
Figure 4:
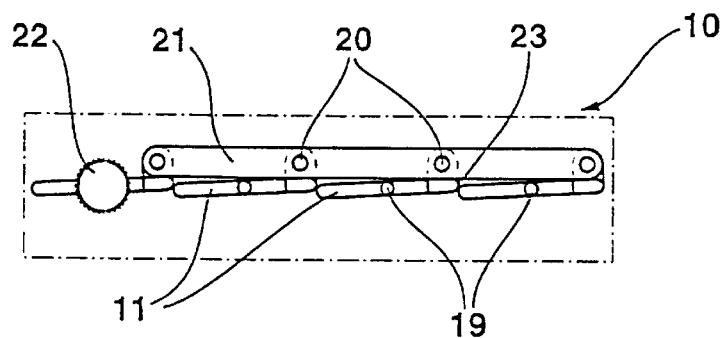
FIG. 4 shows a view of the mounting frame according to FIG. 3 in the direction indicated by arrow IV.
Figure 5:
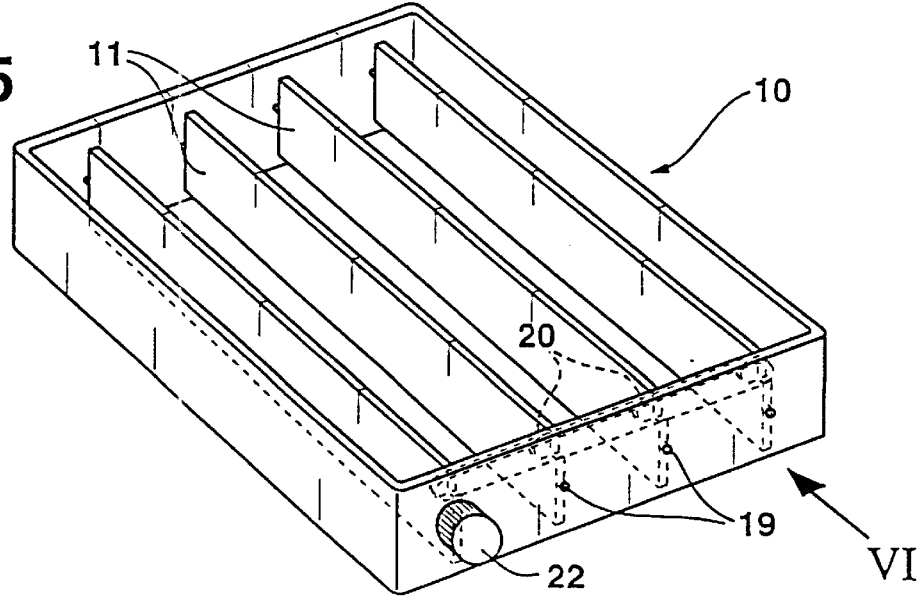
FIG. 5 shows the mounting frame according to FIG. 3, but with the lamellae in their fully open position.
Figure 6:
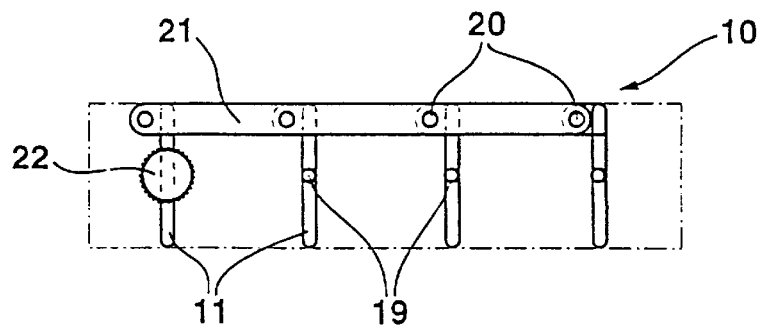
FIG. 6 shows a view of the mounting frame according to FIG. 4, but with the lamellae in their open position.

FIG. 2 shows the analogous housing (1a) of a heating and/or air-conditioning installation of the prior art. Identical parts are designated here by the same reference numerals, supplemented only by an (a). Again, air flows into the vaporizer (2a), in the direction of arrow (6), and the heater (3a) may by either included in or excluded from the flow path, depending on whether the channel (8a) or (9a) are open or closed. However, in contrast to the control means for opening or closing the channels, which in the case of FIG. 1 take the form of mounting frames with lamellae, the means in the present case are configured as a control flap (17) supported to swing about the axis (16), which flap, when in its position (17a), closes the channel (9) and, thus, the chamber (12a), so that fresh air will be directed into the passenger compartment. In its position (17) the flap closes the channel (8a) so that in this position the air will be guided through the vaporizer and the heater (3a). As indicated by the dash-dotted line, the flap (17), being designed as a double-armed lever, requires relatively much space for its pivotal movement. This has the result that the overall length ($L_2$) of the prior-art installation is greater than the overall length ($L_1$) of the installation according to the invention, as indicated for comparison in FIG. 1. The length $L_1$ is equal only to approximately 0.6 times the length of $L_2$. In the case of smaller opening angles, the air flow may become layered, and this phenomenon may obstruct effective intermixing.

FIGS. 3 to 6 show the structure of the mounting frames 10 and 10' according to FIG. 1. The frames consist of a frame (18) whose dimensions are adapted to the dimensions of the channels (8) and (9), respectively, or to the outlet from the chamber (12), and which supports the ends of the lamellae, the latter being provided with pivot pins (19). Each of the lamellae (11) has one of its longitudinal edges mounted, via a firmly attached lug (20), on a common adjusting lever (21) so that the lamellae can be adjusted by means of a common drive. In the case of the illustrated embodiment this is achieved by the fact that a pinion—not shown—of a drive motor drives a pinion (22) firmly connected with one of the lamellae (11) in such a way that each of the lamellae performs a pivotal movement by approximately 90°. This permits the lamellae (11) to be commonly pivoted from their closed position illustrated in FIGS. 4 and 3, in which they are in contact one with the other by sealing lips (23) indicated schematically, into their open position illustrated in FIGS. 5 and 6. In the different intermediate positions, the free flow cross-section is reduced correspondingly.

Figure 7:
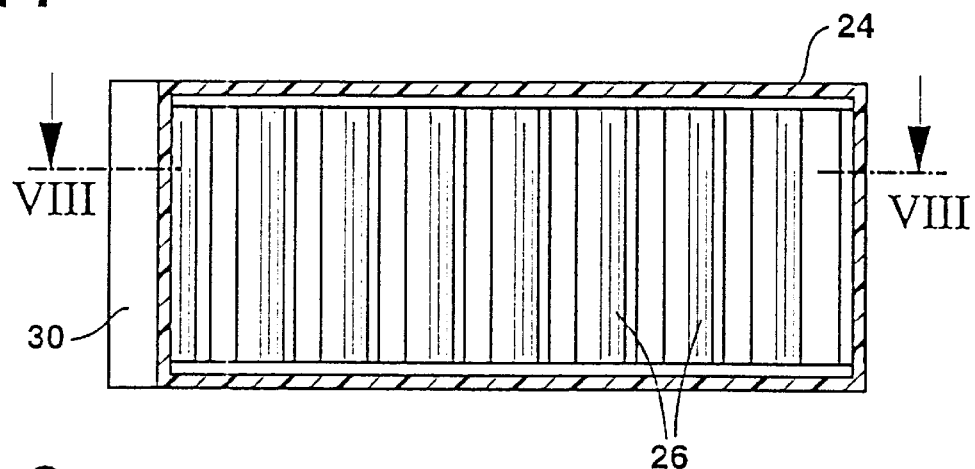
FIG. 7 shows a front view of another embodiment of a mounting frame.
Figure 8:
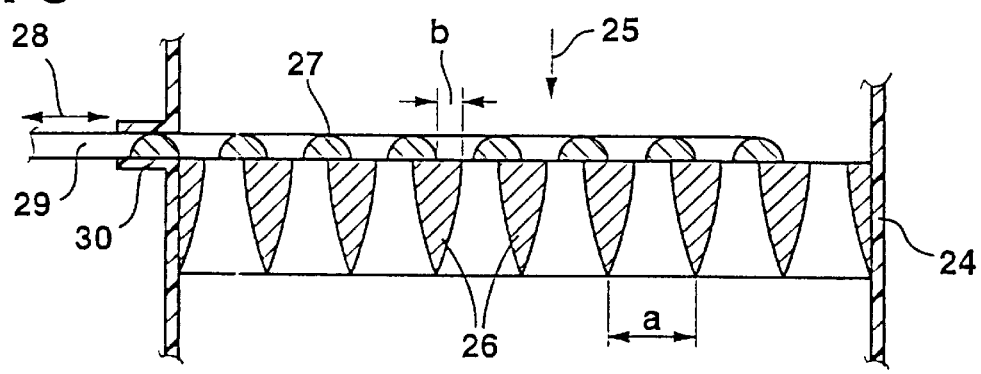
FIG. 8 shows a sectional view of the embodiment according to FIG. 7, taken along line VIII—VIII.

FIGS. 7 and 8 show a variant of a mounting frame with lamella grid insofar as in this case no hinged lamellae (11) are arranged in the frame (24); instead, drop-shaped flow profiles that taper in a direction opposite to the direction of flow (25) are distributed over the rectangular cross-section. All these lamellae (26), that are configured as flow profiles, are each provided with an end cap (27) that points in a direction opposite to the direction of flow and that can be displaced relative to the fixed portion (26) of the profile lamellae, in the direction indicated by arrows (28)—as can be seen in FIG. 8. FIG. 8 illustrates the position in which the cap portions (27), being again arranged on a common sliding frame (29), have been moved into an intermediate position between the profile lamellae (26) which are arranged at an equal spacing (a). This position permits a reduced flow through the mounting frame (24). When the cap portions (27) are moved farther to the left until they completely close the free space between neighboring profiles (26), then the free cross-section is fully closed. When they are moved from the position illustrated in FIG. 8 to the right by an amount (b), then the flow cross-section is fully open. In the case of this embodiment, as indicated at 30, the sliding frame (29) is retained in a guide—not shown in detail—for displacement in the direction of arrow (28).

Figure 9:
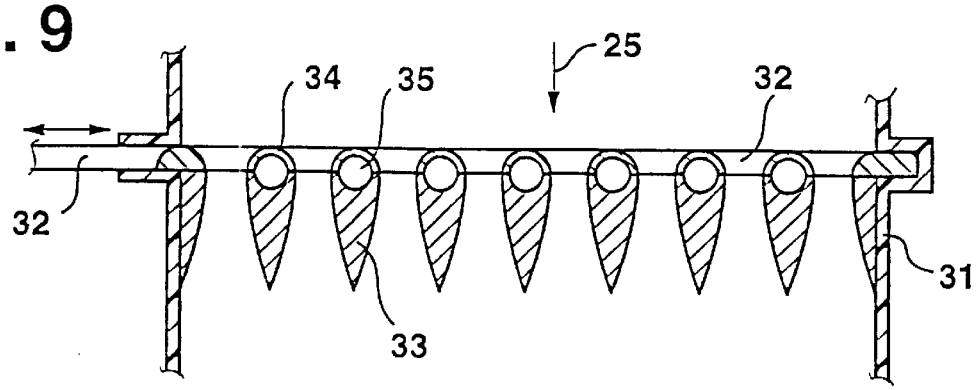
FIG. 9 shows a sectional view similar to that of FIG. 8, but of a different embodiment, with the lamella grid in the fully open position.
Figure 10:
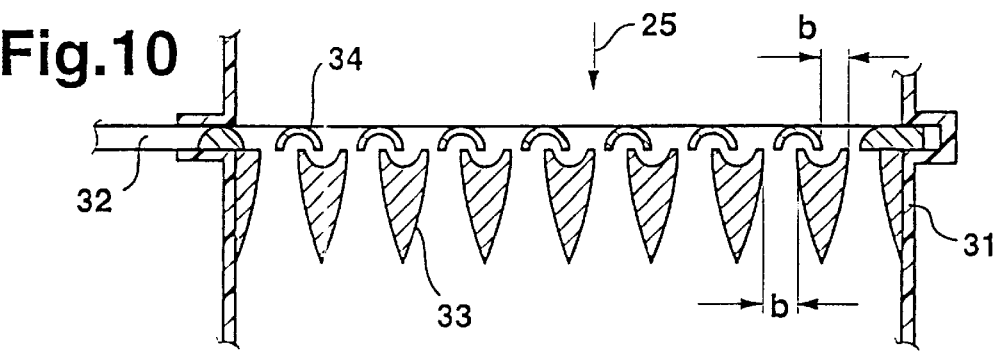
FIG. 10 shows a cross-sectional representation to that of FIG. 9, but in a position with partially reduced air flow.
Figure 11:
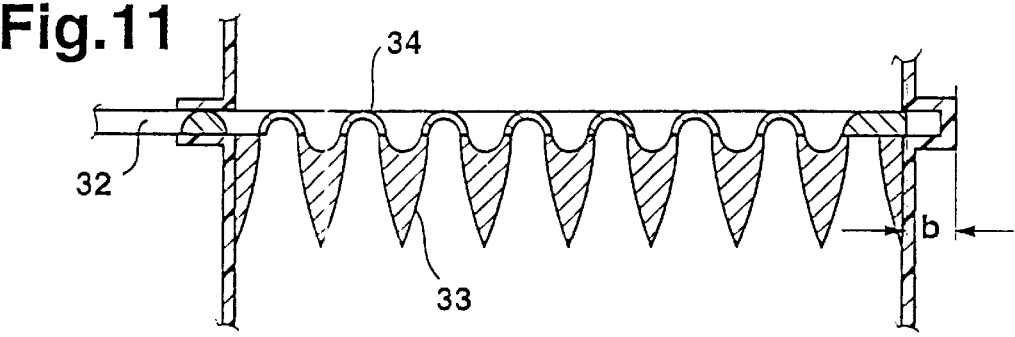
FIG. 11 shows a cross-sectional view identical to that of FIG. 9, but with the flow cross-section fully closed.

FIGS. 9 to 11 show a variant of a mounting frame (31) that operates principally in the same manner as the grid frame according to FIGS. 7 and 8. Here again, a number of lamellae (33) with a drop-shaped flow profile are provided in the mounting frame (31) in equally spaced distribution over the cross-sectional surface, and again their heads, that point in a direction opposite to the direction of flow (25), are arranged in a frame (32) capable of sliding relative to the frame (31). In the position illustrated in FIG. 9, which shows the full flow cross-section through that grid, passage openings (35) of circular cross-section, the function of which will become apparent from the intermediate position shown in FIG. 10, are formed between the movable heads (34) and the fixed profiles (33). That is, in this position, in which the sliding frame (32) is displaced by an amount (b) equal to half the width of a profile (33), measured crosswise to the direction of flow (25), the heads (34) cover just half of the free flow cross-section between neighboring lamella profiles (33), because the mutual spacing between all profiles is such that the free passage width between two profiles (33) is equal to the value (b). Due to the particular design of the opening (35) between the head (34) and the profile element (33), however, S-shaped flow channels are obtained on each profile (33, 34), in the position illustrated in FIG. 10, in addition to the remaining free flow cross-section, which S-shaped flow channels permit additional air to flow so that optimized flow guidance is achieved in this intermediate condition, which largely prevents undesirable turbulence, for example behind the flap elements (27) in FIG. 8. FIG. 11 finally shows the closed position in which the sliding frame (32) has been displaced from the right to the left by an amount (b). The flow cross-section is fully closed in this position.

Figure 12:
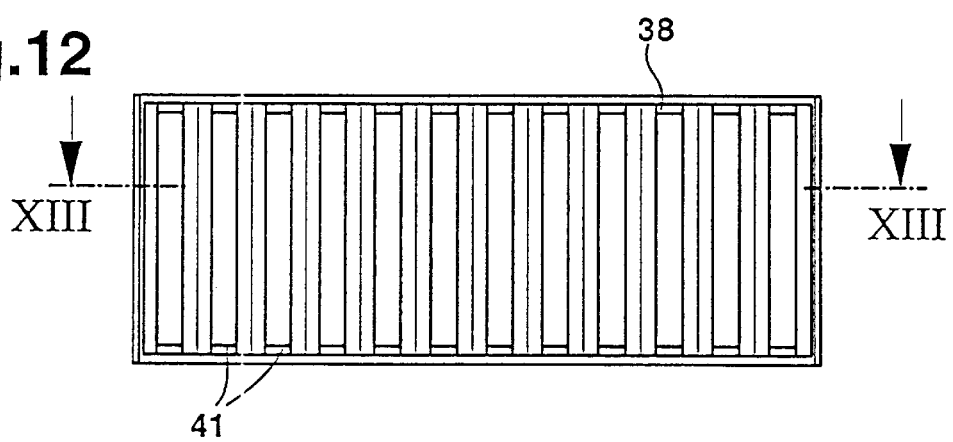
FIG. 12 shows a front view similar to that of FIG. 7, but of a different variant of a mounting frame.
Figure 13:
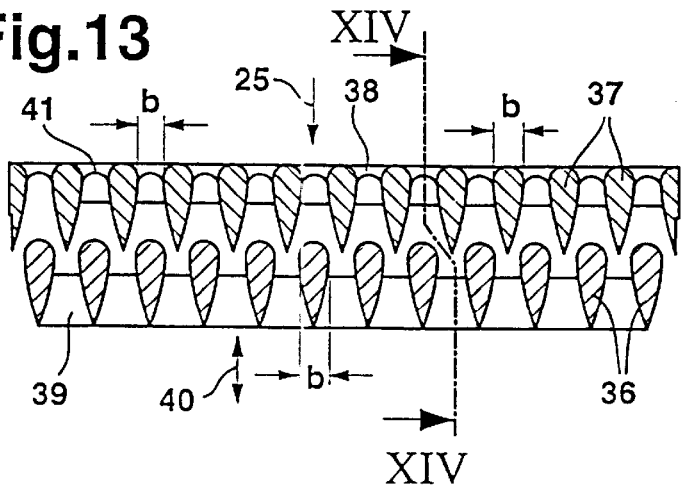
FIG. 13 shows a sectional view of the mounting frame according to FIG. 12, taken along XIII—XIII, in the open position.
Figure 14:
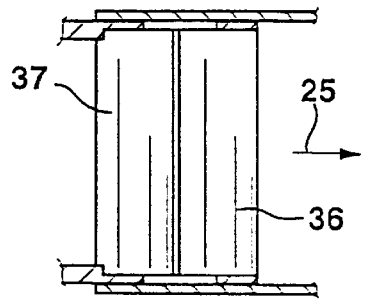
FIG. 14 shows a sectional view of the representation of FIG. 13, taken along line XIV.

FIGS. 12 to 14 show another variant of a mounting frame using a closure grid with lamellae (36) in the form of a flow profile. In the case of this design, two substantially equal arrays of lamella profiles (36) and (37) are provided, with the lamella profiles (37) arranged in a stationary part, serving as mounting frame, and the lamellae (36) arranged in a frame (39) that can be displaced relative to the frame (38) in the flow direction (25) and in opposite direction, in the sense indicated by arrows (40). The dimensions are selected in such a way that the free flow width (b) between the lamellae (37) corresponds to the width of the individual lamella profiles (37 and 36). Consequently, the profiles (36) can be moved into the space between the profiles (37) in a manner such that the free flow cross-section between the lamella profiles (37) becomes fully closed. Additionally, there may be provided in this case, at the upper and lower ends, web-like connection pieces (41) located between the fixed lamella profiles (27) at their front ends, which connection pieces serve to provide a terminal portion at the upper and lower ends of the movable lamella profiles (36).

Figure 15:
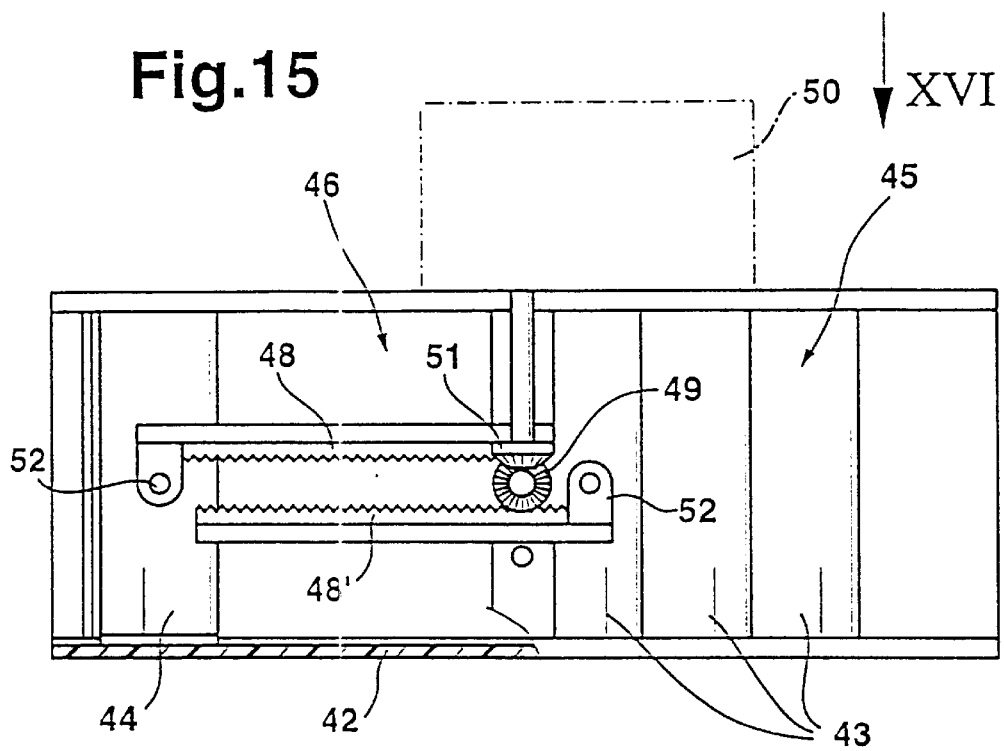
FIG. 15 shows a view similar to that of FIG. 12, but of still another variant of a mounting frame with a lamella arrangement where the lamellae are slidable in the frame, one parallel to the other.
Figure 16:
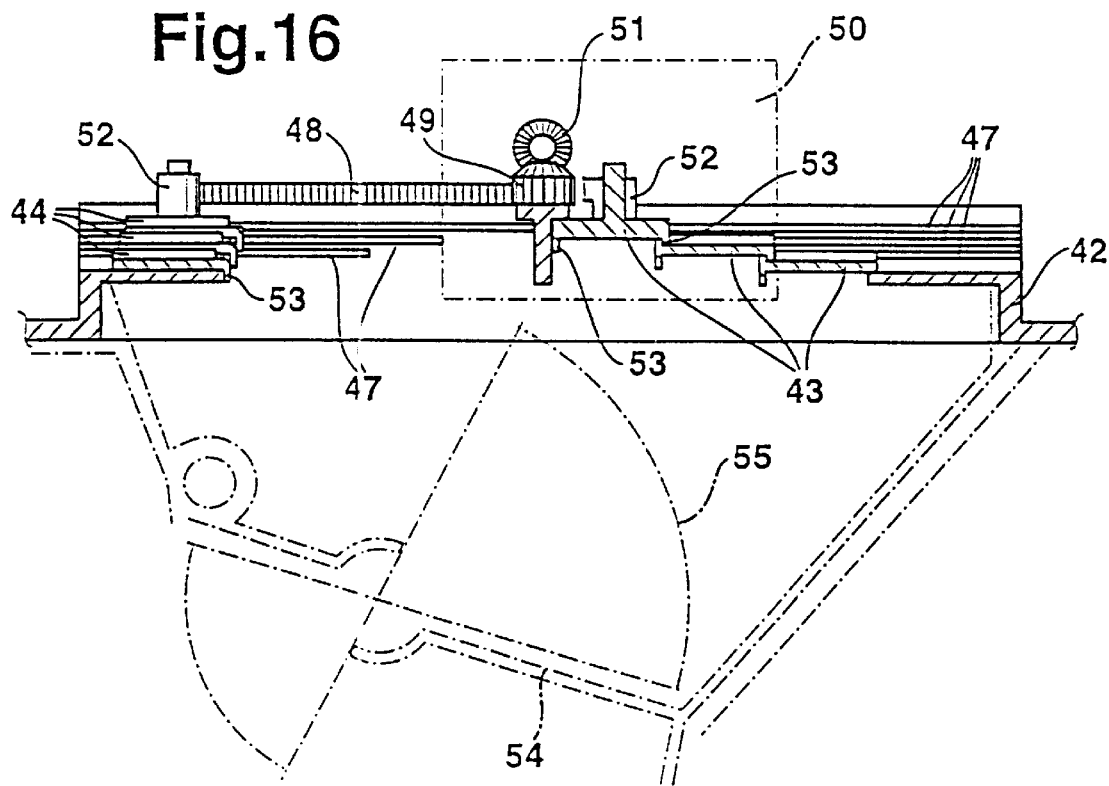
FIG. 16 shows a top view of the mounting frame according to FIG. 15, viewed in the direction of arrow XVI.

FIGS. 15 and 16 finally show a last variant of a mounting frame (42) comprising an array of lamellae (34) mounted in a guide in the frame (42) for being displaced in parallel one to the other, in the manner of shutters.

The arrangement of this variant is such that the mounting frame (42), which just like the other mounting frames illustrated in the previous figures is conveniently made from a plastic material, is provided with two lamella arrays (43) and (44), each of which individually closes or opens a right-hand or left-hand flow opening (45) or (46), respectively. To this end, groove-like guides (47) for the lamellae (44) and (43), respectively, are provided in the frame (42), which serve as guides for the upper and lower edges of the lamellae (43 and 44). The innermost lamella of each set (43 and 44) is connected, via a toothed rod (48), with a bevel gear (49) that engages the bevel pinion (51) of an electric motor (50). As appears from FIG. 15, the toothed rods (48 and 48') engage the gear (49) in such a way that when the bevel gear (49) is driven, the two toothed rods are moved in opposite directions one to the other. FIG. 15 thus shows the toothed rod (48) in its left position, in which the lamella (44) connected to it via the pivot lug (52) has been moved to its outermost left position. Since this lamella (44)—just as all other lamellae (44)—is provided with a guide edge (53) on both its lateral edges, each lamella that is driven by the toothed rod (48) will entrain its neighboring lamella so that in the case of the embodiment illustrated in FIG. 15 the displaceable lamellae (44) are all in their left end positions so that the opening (46) is clear.

In contrast, the second toothed rod (48') occupies the position illustrated in FIG. 15, with its pivot lug in the position facing the center of the frame (42), in which the innermost lamella (43), which just as the lamellae (44) is provided with guide edges (53) on both ends, has entrained the respective neighboring lamellae so that the three lamellae (43) all overlap each other and close the flow opening (45) in full. Such a design may be employed with advantage, for example, when flow channels must be alternately opened and closed in the housing of the heating and/or air-conditioning installation, as has been described above with reference to FIG. 1 and the channels (8 and 9).

The dash-dotted lines in FIG. 16 show once more, by way of comparison of the required mounting dimensions, a solution where a hinged flap (54) is used for opening or closing the respective flow channels, that are now formed by the openings (46 and 45). It can be clearly seen that, due to the swing radius of the flap (54) and the housing configuration required for this purpose, a considerably larger overall space is needed in this case.

We claim:

1. An airflow control system for a heating/air conditioning system of a motor vehicle, comprising:

a housing defining an inlet, an outlet, and an interior space between said inlet and said outlet, first, second, and third airflow control units arranged in said interior space, each said airflow control unit extending between a common axis located approximately centrally in said interior space and said housing such that a vaporizer chamber, a heater chamber, and an outlet chamber are defined, said vaporizer chamber being defined by said first and second airflow control units, said inlet, and said housing, said heater chamber being defined by said second and third airflow control units and said housing, said outlet chamber being defined by said first and third airflow control units, said outlet, and said housing, each of said airflow control units comprising a frame extending along said common axis and along the housing, and a plurality of lamellae mounted in said frame to be selectively movable between a closed position and an open position.

2. An airflow control system according to claim 1, further comprising a common drive configured to simultaneously selectively move the lamellae of said first, second, and third airflow control units.

3. An airflow control system according to claim 1, further comprising a vaporizer arranged in said vaporizer chamber and a heater arranged in said heater chamber.

4. An airflow control system according to claim 1, wherein the housing is provided with insertion openings for the frames.

5. An airflow control system according to claim 1, wherein each of said lamellae is arranged to swing around an angle of 90° about an axis supported in a portion of the frame.

6. An airflow control system according to claim 1, wherein the lamellae are arranged to slide in the frame in parallel, in the manner of shutters.

7. An airflow control system according to claim 1, wherein the lamellae take the form of grids with flow profiles that are aligned in a flow direction.

8. An airflow control system according to claim 7, wherein two of said grids are arranged to slide relative to each other for influencing airflow therethrough.

9. An airflow control system according to claim 8, wherein said lamellae have a drop-shaped flow profile in the flow direction, and a space between adjacent ones of said lamellae corresponds to a greatest width of the lamellae of the second grid.

10. An airflow control system according to claim 9, wherein the two grids are moveable relative to each other in the flow direction so that the profiles of the lamellae of one grid can be slid into a free cross-section of the profiles of the other grid.

11. An airflow control system according to claim 7, wherein part of the flow profiles are displaceable in a direction transverse to the flow direction.

12. An airflow control system according to claim 1, wherein the lamellae are interconnected and commonly driven.

13. An airflow control system according to claim 4, wherein each of said lamellae is arranged to swing around an angle of 90° about an axis supported in a portion of the frame.

14. An airflow control system according to claim 4, wherein the lamellae are arranged to slide in the frame in parallel, in the manner of shutters.

15. An airflow control system according to claim 6, wherein the lamellae are interconnected and commonly driven.

16. An airflow control system according to claim 7, wherein the lamellae are interconnected and commonly driven.

17. An airflow control system according to claim 9, wherein the lamellae are interconnected and commonly driven.

18. An airflow control system according to claim 1, wherein the housing is provided with receiving pockets for the mounting frames.

* * * * *